US012610940B1

(12) United States Patent
Bradac

(10) Patent No.: US 12,610,940 B1
(45) Date of Patent: Apr. 28, 2026

(54) RODENT INTRUSION BARRIER FOR FOUNDATION MOUNTED ELECTRICAL SIGNALING AND LIGHTING FIXTURES

(71) Applicant: James M. Bradac, Hudson, WI (US)

(72) Inventor: James M. Bradac, Hudson, WI (US)

(*) Notice: Subject to any disclaimer, the term of this patent is extended or adjusted under 35 U.S.C. 154(b) by 224 days.

(21) Appl. No.: 18/507,665

(22) Filed: Nov. 13, 2023

Related U.S. Application Data

(60) Provisional application No. 63/383,532, filed on Nov. 14, 2022.

(51) Int. Cl.
*A01M 29/30* (2011.01)

(52) U.S. Cl.
CPC ................................... *A01M 29/30* (2013.01)

(58) Field of Classification Search
CPC ............................... A01M 29/30; A01M 99/00
USPC ........................................................... 52/835
See application file for complete search history.

(56) References Cited

U.S. PATENT DOCUMENTS

| | | | | | |
|---|---|---|---|---|---|
| 5,479,741 A | * | 1/1996 | Underwood | ........... | A01G 13/27 |
| | | | | | 47/32.4 |
| 6,009,683 A | * | 1/2000 | Grewe | ...................... | E04C 3/30 |
| | | | | | 52/301 |
| 6,291,774 B1 | * | 9/2001 | Williams | ............... | H01B 17/00 |
| | | | | | 174/138 R |
| 7,665,264 B1 | * | 2/2010 | Wolfe | ...................... | E04B 7/22 |
| | | | | | 52/763 |
| 8,011,030 B2 | * | 9/2011 | Li | ........................... | E03C 1/262 |
| | | | | | 4/286 |
| 8,959,871 B2 | * | 2/2015 | Parenti | ..................... | E04C 3/36 |
| | | | | | 52/170 |
| 9,787,071 B1 | * | 10/2017 | Rauckman | ........... | H02G 3/0418 |
| 9,890,536 B2 | * | 2/2018 | Lolio, Jr. | ............ | E04D 13/0645 |
| 11,371,243 B2 | * | 6/2022 | Jarvie | ................... | E04B 2/8641 |
| 2013/0186811 A1 | * | 7/2013 | Kaiser | ................... | E03F 5/0404 |
| | | | | | 210/163 |
| 2018/0106025 A1 | * | 4/2018 | Schuster | ................. | E03C 1/262 |

OTHER PUBLICATIONS

Halek Solutions [online] (HOME—Roadway Lights—Signal Lights), published as early as Aug. 3, 2020 [wayback machine], [retrieved on Dec. 13, 2023]. Retrieved from the Internet <URL: https://www.haleksolutions.com/>.

* cited by examiner

*Primary Examiner* — Paola Agudelo
(74) *Attorney, Agent, or Firm* — Sherrill Law Offices, PLLC; Michael Sherrill

(57) ABSTRACT

A formed rodent intrusion barrier for foundation mounted electrical signaling and lighting pole fixtures having a bottom opening of defined peripheral shape into an electrical wiring cavity. The intrusion barrier includes a formed, radially thin, radially perforated, axially split, pliable, elastic, electrically insulating, encircling band, and a means for connecting the first and second ends of the formed band after installation within the electrical wiring cavity to form a peripherally continuous barrier.

16 Claims, 16 Drawing Sheets

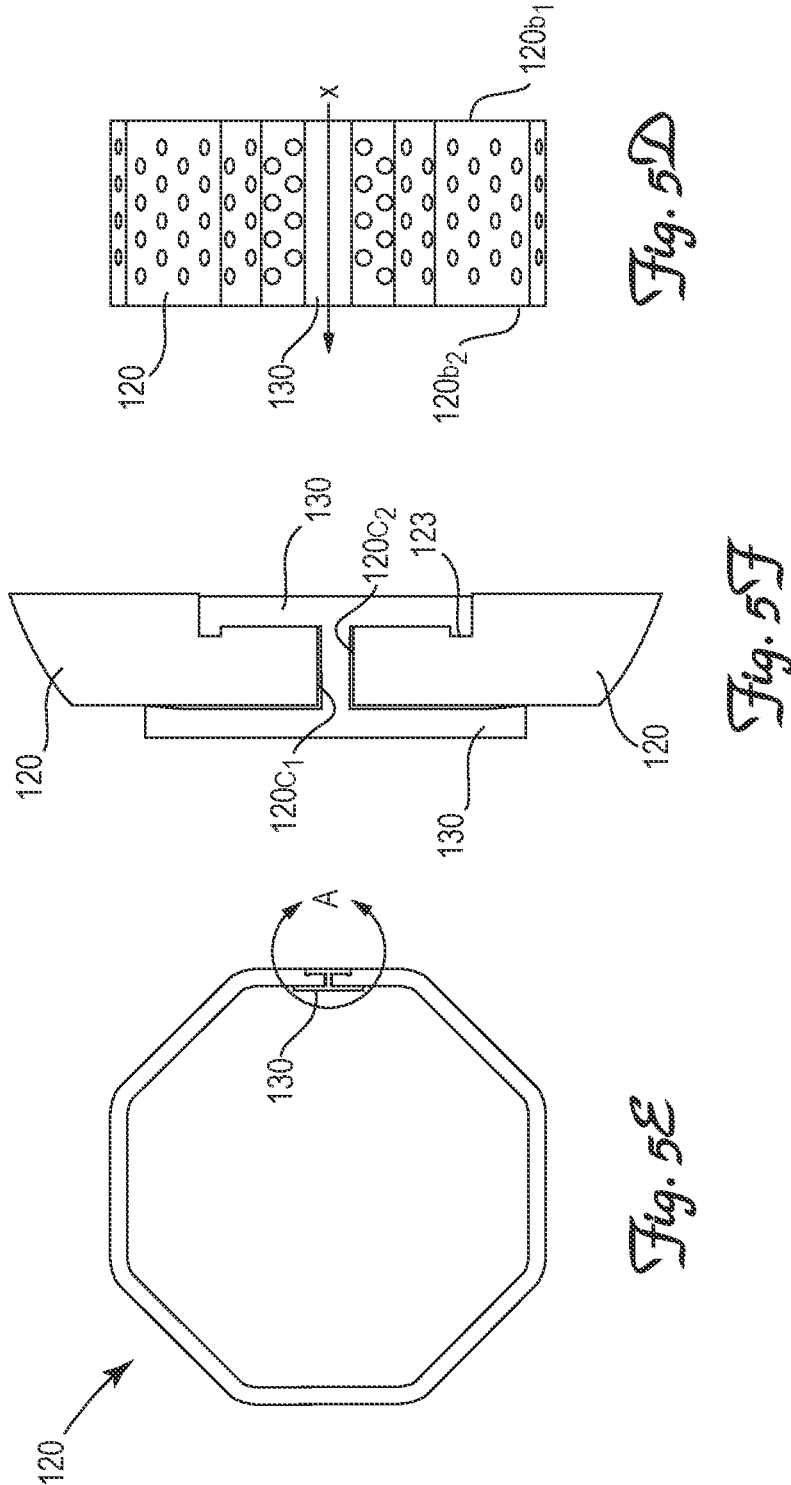

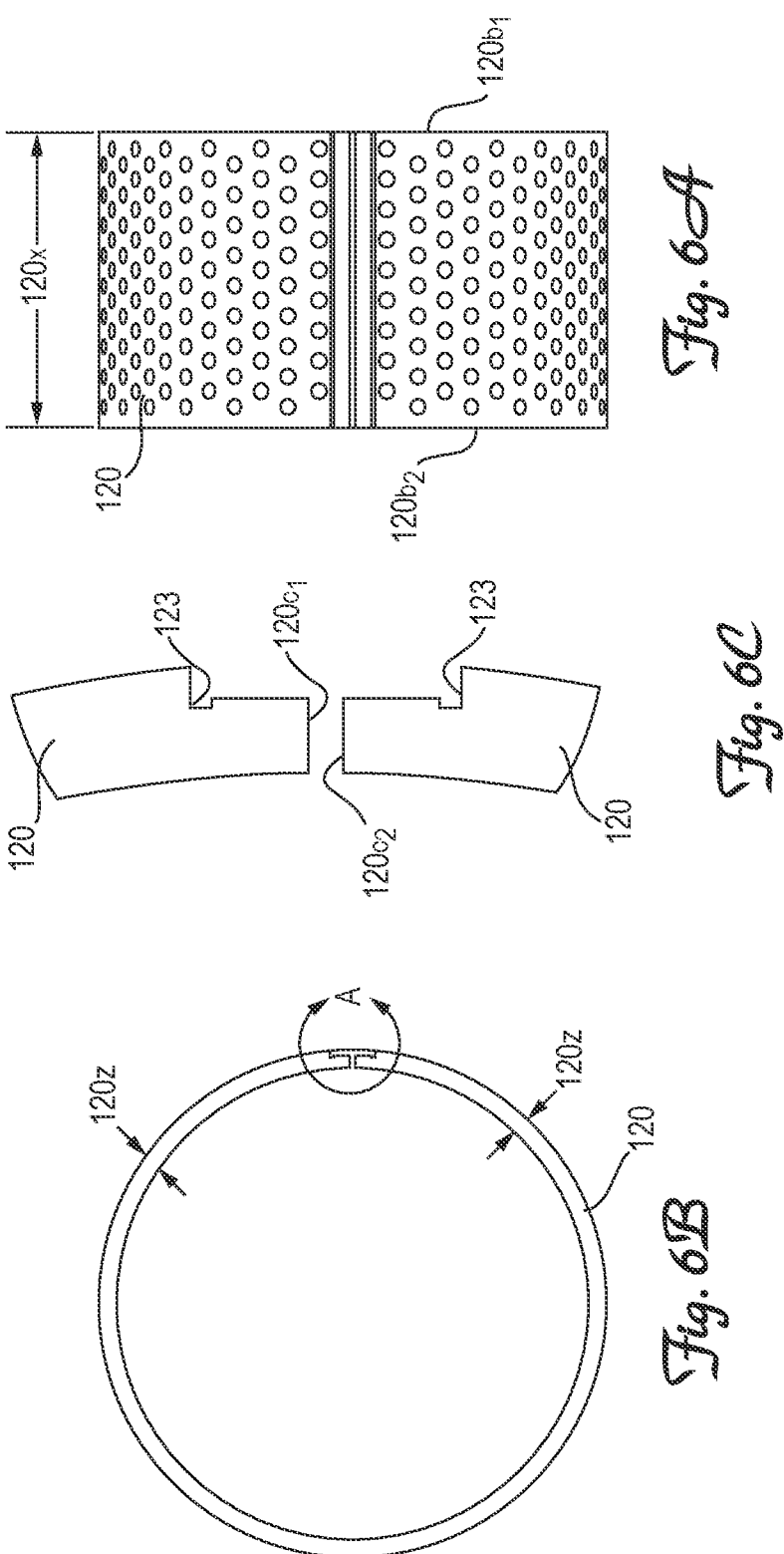

RODENT INTRUSION BARRIER FOR FOUNDATION MOUNTED ELECTRICAL SIGNALING AND LIGHTING FIXTURES

BACKGROUND

Foundation mounted electrical signaling and lighting fixtures, such as traffic signals and light poles, are known to regularly suffer damage to internal wiring due to rodents entering and nesting in the electrical wiring cavity, sometimes damaging the wiring to the point that operation of the fixture is dangerously impaired.

A longstanding need exists for a ready-to-use, extended useful life, electrical insulating, weather resistant, air and moisture porous rodent intrusion barrier for foundation mounted electrical signaling and lighting fixtures, especially one capable of both original and retrofit hand installation sans use of any tools.

BRIEF DESCRIPTION OF THE DRAWINGS

FIG. 5D is a side view of the assembled rodent intrusion barrier depicted in FIG. 5.

FIG. 5E is a top view of the assembled rodent intrusion barrier depicted in FIG. 5.

FIG. 5F is an enlarged top view of the assembled rodent intrusion barrier depicted in FIG. 5B, encircled by line A to facilitate viewing of the connected first and second peripherally adjacent ends of the band.

FIG. 6A is a side view of the band component of the rodent intrusion barrier depicted in FIG. 6.

FIG. 6B is a top view of the band component of the rodent intrusion barrier depicted in FIG. 6.

FIG. 6C is an enlarged top view of a portion of the band component of the rodent intrusion barrier depicted in FIG. 6B, encircled by line A to facilitate viewing of the first and second peripherally adjacent ends of the band.

DETAILED DESCRIPTION OF THE INVENTION INCLUDING A PREFERRED EMBODIMENT

Definitions

As utilized herein, the phrase "electrically insulating material" means a material in which electric current does not flow freely, as contrasted with an electrically conductive material such as aluminum, copper and steel. Exemplary electrically insulating materials include specifically but not exclusively plastic, glass, wood and rubber.

As utilized herein, the term "elastic", in reference to an encircling band in accordance with the present invention, means an ability to return to its original shape after being deformed.

As utilized herein, the term "pliable", in reference to an encircling band in accordance with the present invention, means an ability to separate the first and second peripherally adjacent ends a distance equal to the radius of the band without the aid of a tool and without reaching the elastic limit of the band.

As utilized herein, the term "thin" means less than 2 cm, the term "extra thin" means less than 1 cm, and the phrase "ultra thin" means less than 0.5 cm.

| Nomenclature Table | |
|---|---|
| REF. NO. | DESCRIPTION |
| 100 | Rodent Intrusion Barrier |
| 120 | Band |
| $120a_1$ | Inner Major Surface of Band |
| $120a_2$ | Outer Major Surface of Band |
| $120b_1$ | First Edge of Band |
| $120b_2$ | Second Edge of Band |
| $120c_1$ | First End of Band |
| $120c_2$ | Second End of Band |
| $120x$ | Height of Band |
| $120y$ | Length of Band |
| $120z$ | Width of Band |
| $121c_1$ | First End Margin of Band |
| $121c_2$ | Second End Margin of Band |
| 123 | Interlocking Depression in Band |
| 129 | Perforations through Band |
| 130 | Connector |
| 131 | Central Crossbar of H-shaped Connector |
| 132 | Legs of H-shaped Connector |
| 133 | Interlocking Protrusion on Leg of H-shaped Connector |
| $139_1$ | First Receiving Channel of H-shaped Connector |
| $139_2$ | Second Receiving Channel of H-shaped Connector |
| x | Axial Direction |
| r | Radial Direction |
| A | Foundation Mounted Electrical Signaling or Lighting Pole Fixture |
| B | Base of Fixture |
| $B_8$ | Electrical Wiring Cavity of Base |
| $B_9$ | Bottom Opening in Base into Electrical Wiring Cavity |
| F | Foundation |
| P | Pole of Fixture |

Construction

Figure 1:
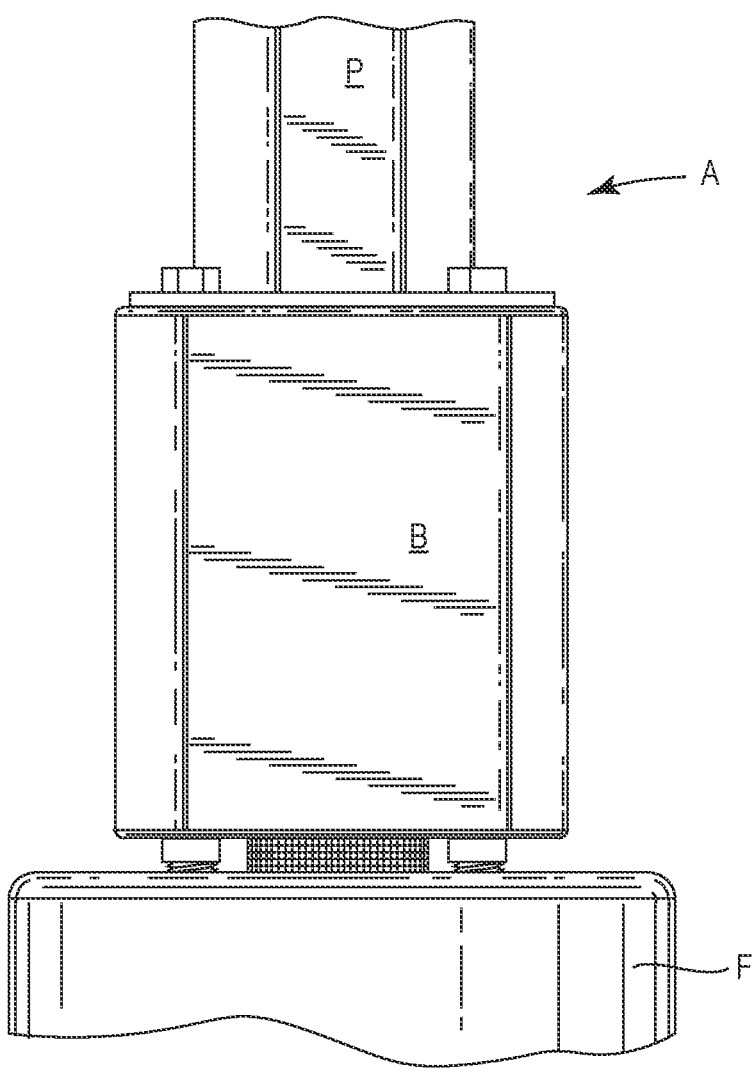
FIG. 1 is a side view of the lower portion of a typical installed, foundation mounted light signal pole equipped with a prior art wire mesh rodent intrusion barrier.
Figure 2:
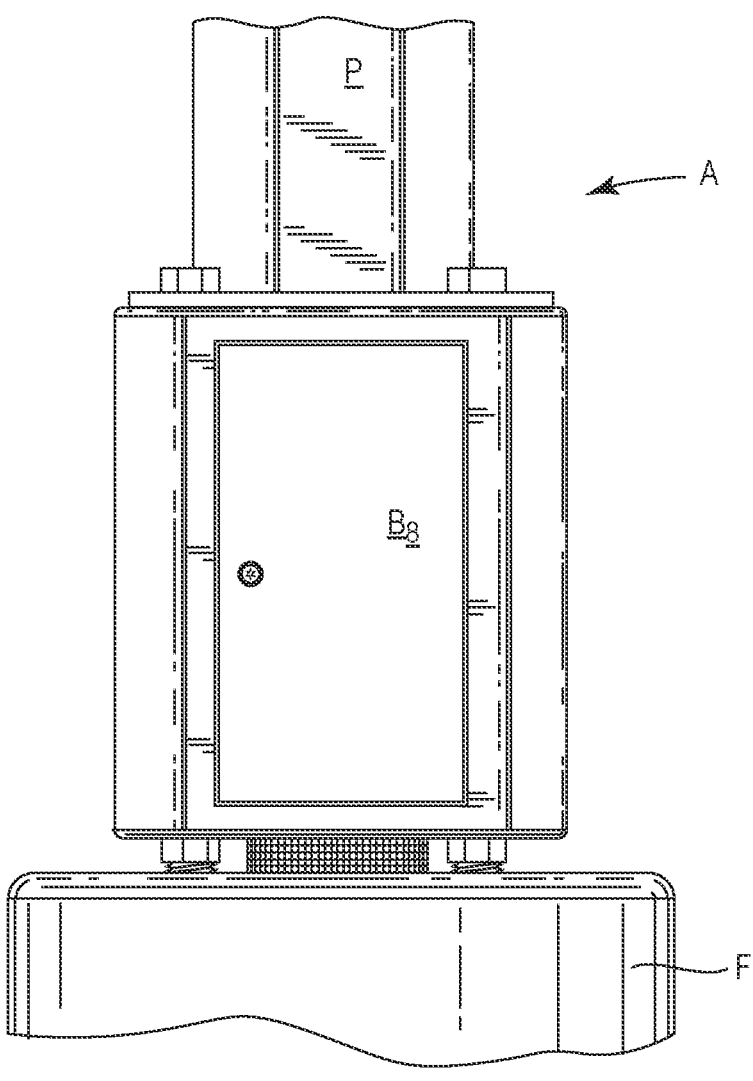
FIG. 2 is a side view of the base portion of the foundation mounted light signal pole of FIG. 1 depicting the side with a removable access panel to the electrical wiring cavity.
Figure 3:
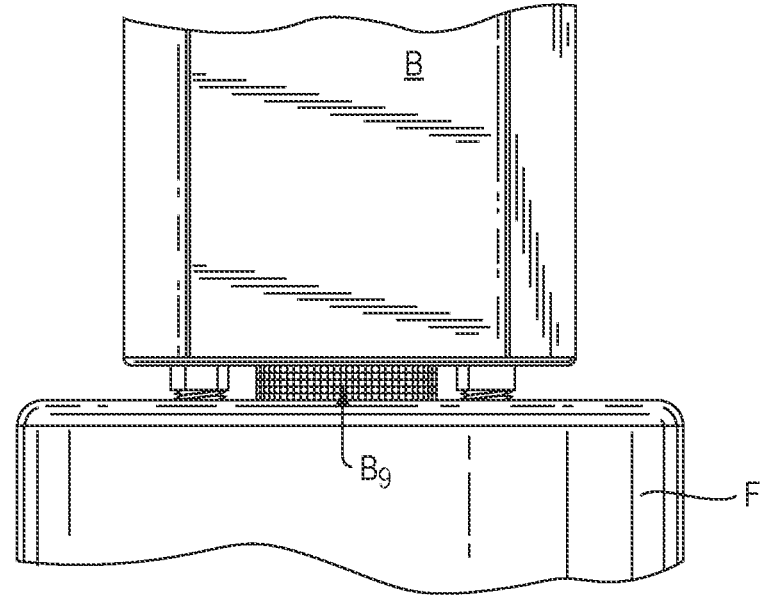
FIG. 3 is a side view of the pole to foundation attachment zone of the foundation mounted light signal pole of FIG. 1 depicting the prior art wire mesh rodent intrusion barrier.
Figure 4:
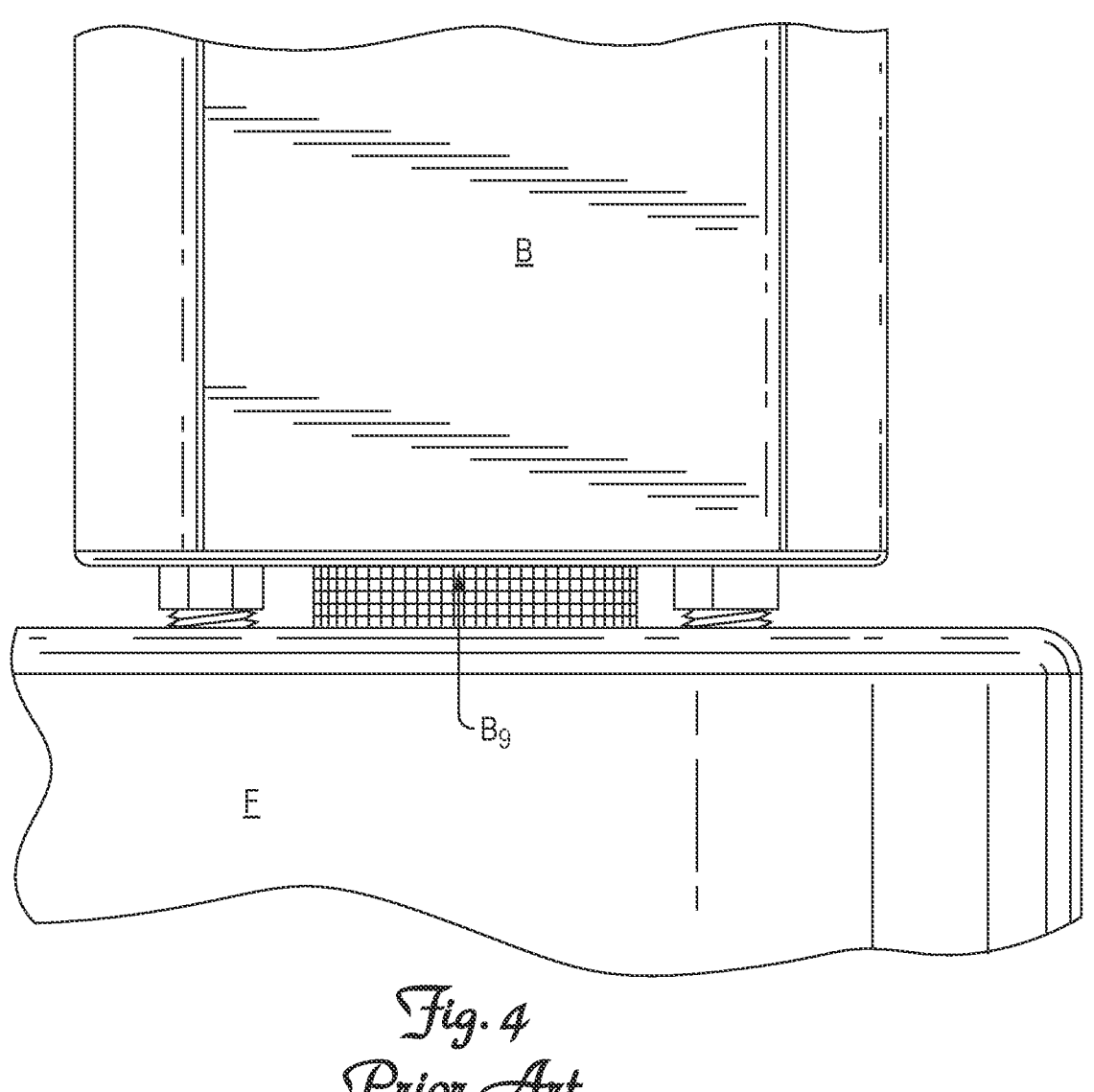
FIG. 4 is a greatly enlarged side view of the prior art wire mesh rodent intrusion barrier depicted in FIG. 3.
Figure 5:
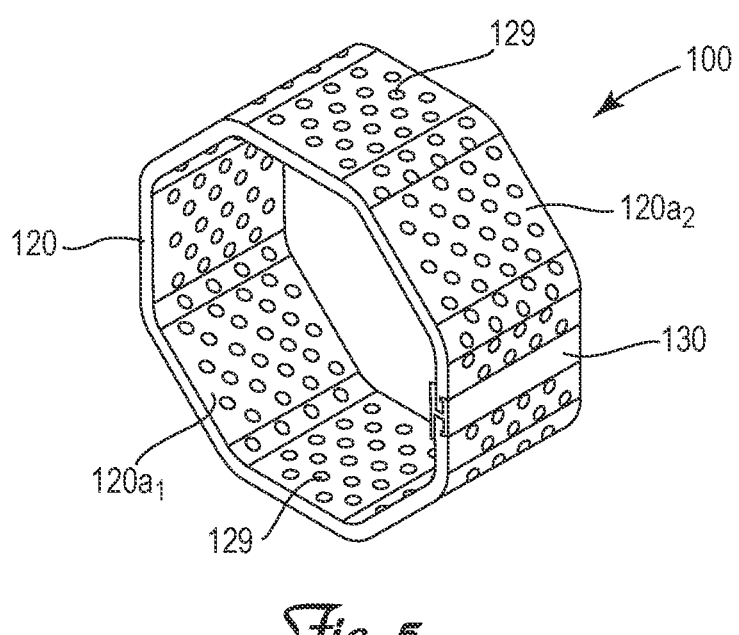
FIG. 5 is a perspective view of one embodiment of an assembled octagon shaped rodent intrusion barrier in accordance with the invention.
Figure 6:
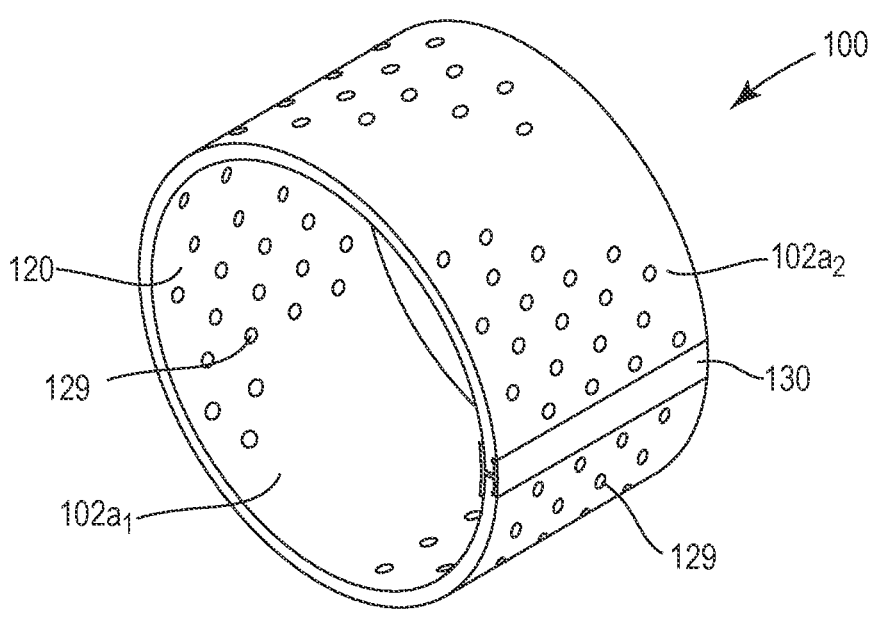
FIG. 6 is a perspective view of one embodiment of an assembled circular shaped rodent intrusion barrier in accordance with the invention.
Figure 7:
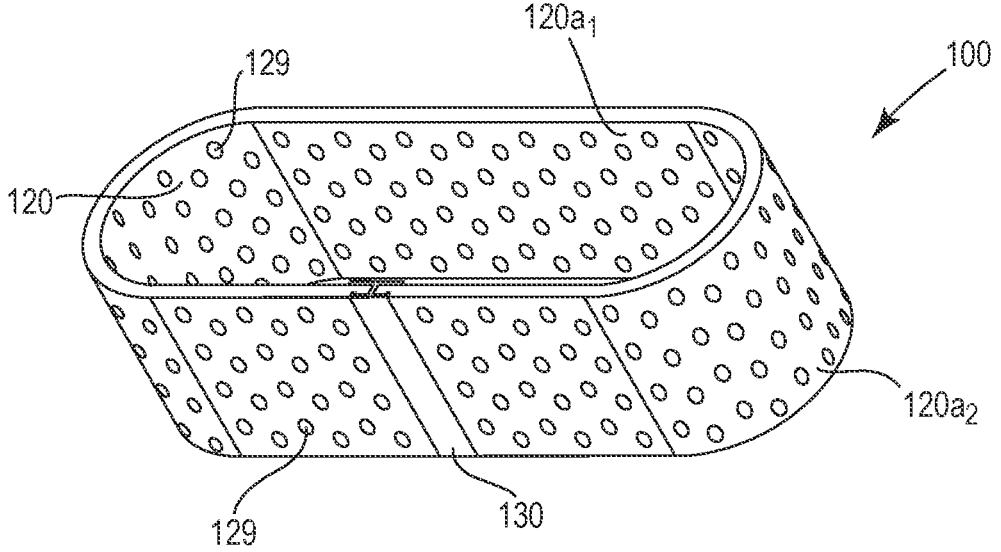
FIG. 7 is a perspective view of one embodiment of an assembled stadium shaped rodent intrusion barrier in accordance with the invention.

Referring to FIGS. 5, 6, 7 and 11, the rodent intrusion barrier 100 includes a band 120 and a connector 130.

Figures 5A, 5B, 5C:
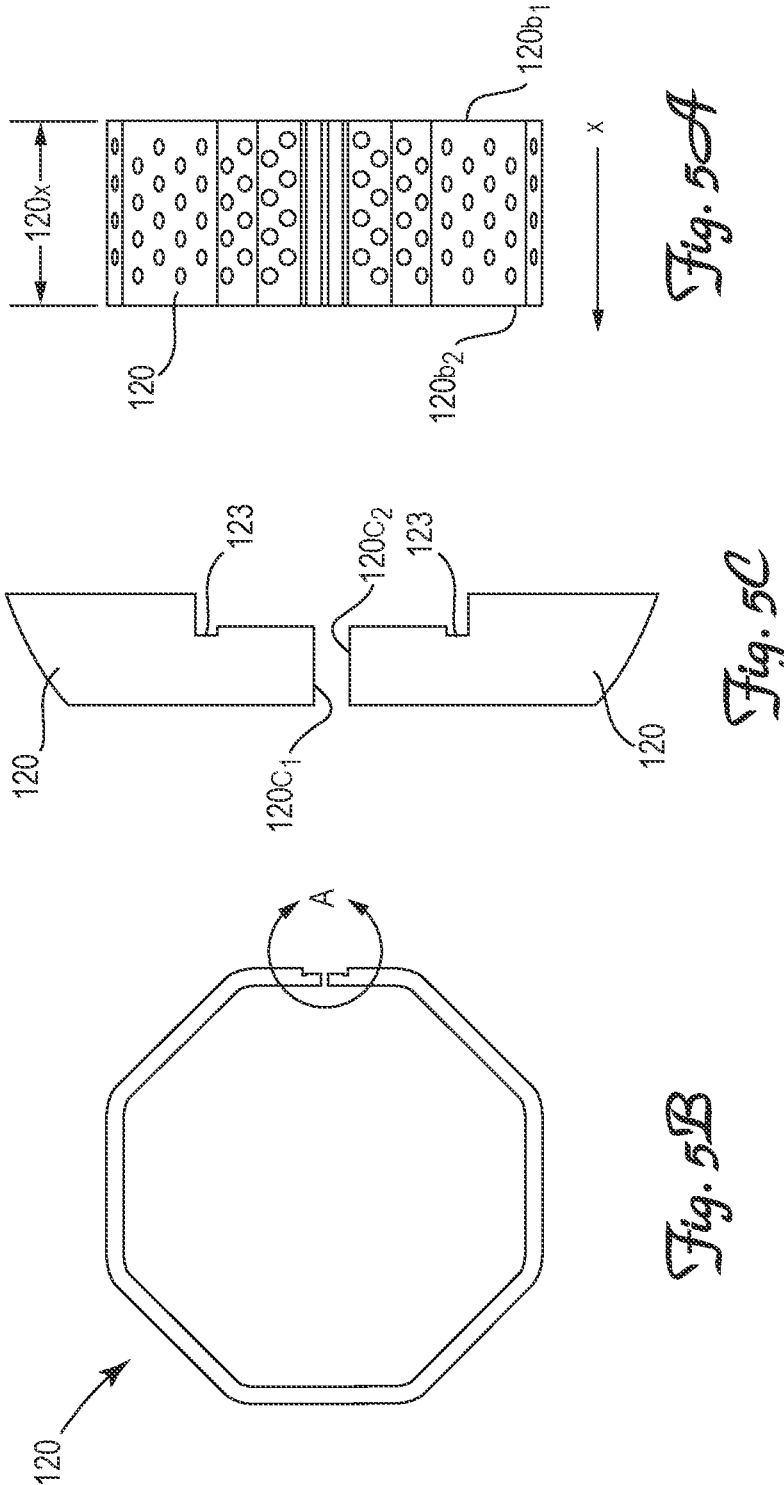
FIG. 5A is a side view of the band component of the rodent intrusion barrier depicted in FIG. 5.
FIG. 5B is a top view of the band component of the rodent intrusion barrier depicted in FIG. 5.
FIG. 5C is an enlarged top view of a portion of the band component of the rodent intrusion barrier depicted in FIG. 5B, encircled by line A to facilitate viewing of the first and second peripherally adjacent ends of the band.
Figure 7A:
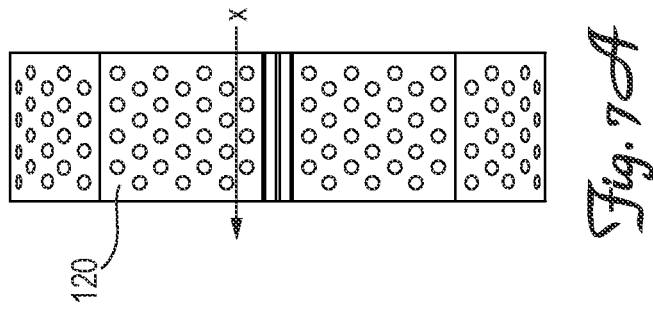
FIG. 7A is a side view of the band component of the rodent intrusion barrier depicted in FIG. 7.
Figure 7C:
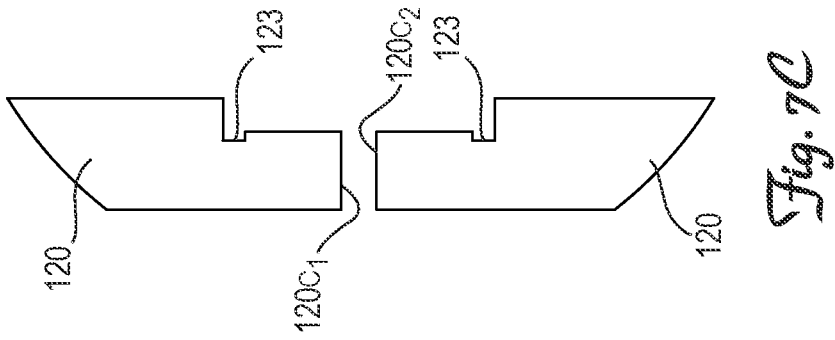
FIG. 7C is an enlarged top view of a portion of the band component of the rodent intrusion barrier depicted in FIG. 7B, encircled by line A to facilitate viewing of the first and second peripherally adjacent ends of the band.
Figure 7B:
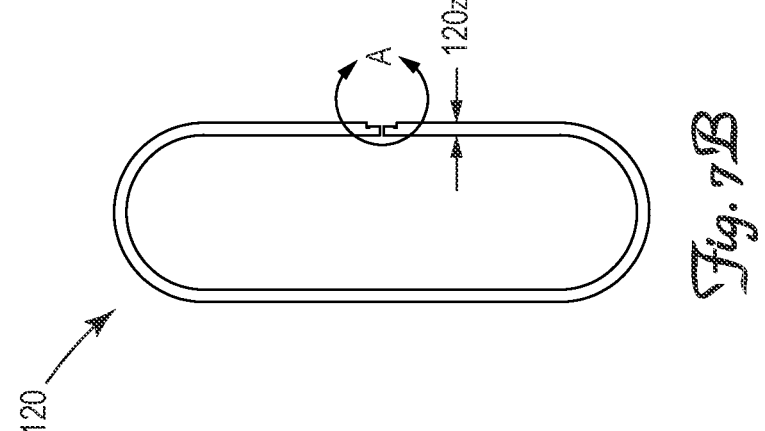
FIG. 7B is a top view of the band component of the rodent intrusion barrier depicted in FIG. 7.

Referring to FIGS. 5A, 5B, 6A, 6B, 7A and 7B, the band 120 has inner and outer radially r spaced major surfaces $120a_1$ and $120a_2$ defining a thickness $120z$, and first and second axially x spaced edges $120b_1$ and $120b_2$ defining a height $120x$. The band 120 has a length $120y$ and is formed into a shape as necessary to conform to the peripheral shape of the bottom opening $B_9$ in the base B of a particular style or model foundation mountable electric signal or lighting pole fixture A. Common peripheral shapes for these bottom openings $B_9$ include specifically but not exclusively circle, oval, stadium, rectangle and square. Other quadrilateral and more complicated general and regular polygon shapes are known.

Still referring to FIGS. 5A, 5B, 6A, 6B, 7A and 7B, the band 120 is axially x split to provide first and second peripherally adjacent ends $120c_1$ and $120c_2$ which can be readily tangentially separated by hand to allow the band 120 to be placed around and encircle electrical wiring at any point along the length of the wiring to facilitate retrofit installation of the rodent intrusion barrier 100.

The band 120 is sufficiently elastic to return to its original formed shaped after being deformed as necessary to retrofit the rodent intrusion barrier 100 around electrical wiring within the confines of an electrical wiring cavity Bs of an installed foundation-mounted electrical signaling or lighting pole fixture A.

The formed band 120 balances rigidity and pliability so as to be both self-supporting when stood upon an edge $120b_1$ or $120b2$, and sufficiently flexible to accommodate tool-free retrofit installation of the rodent intrusion barrier 100 around sizable bundles of electrical wiring within the confines of an electrical wiring cavity Bs of an installed foundation-mounted electrical signaling or lighting pole fixture A.

The band 120 is sufficiently elastic to return to its original formed shaped after being deformed as necessary to retrofit the rodent intrusion barrier 100 around electrical wiring within the confines of an electrical wiring cavity Bs of an installed foundation-mounted electrical signaling or lighting pole fixture A.

The band 120 is formed from electrically insulating material in order to prevent the band 120 from accidentally and unintentionally contacting and shorting the electrical signaling or lighting pole fixture A.

The material of construction and radial r thickness $120z$ of the band 120 are selected to provide the desired elasticity and balancing of rigidity and pliability. Preferred materials of construction are thermoplastic polyolefins such as polyethylene and polypropylene. The band 120 is preferably thin, more preferably extra thin and most preferably ultra thin.

Figure 9:
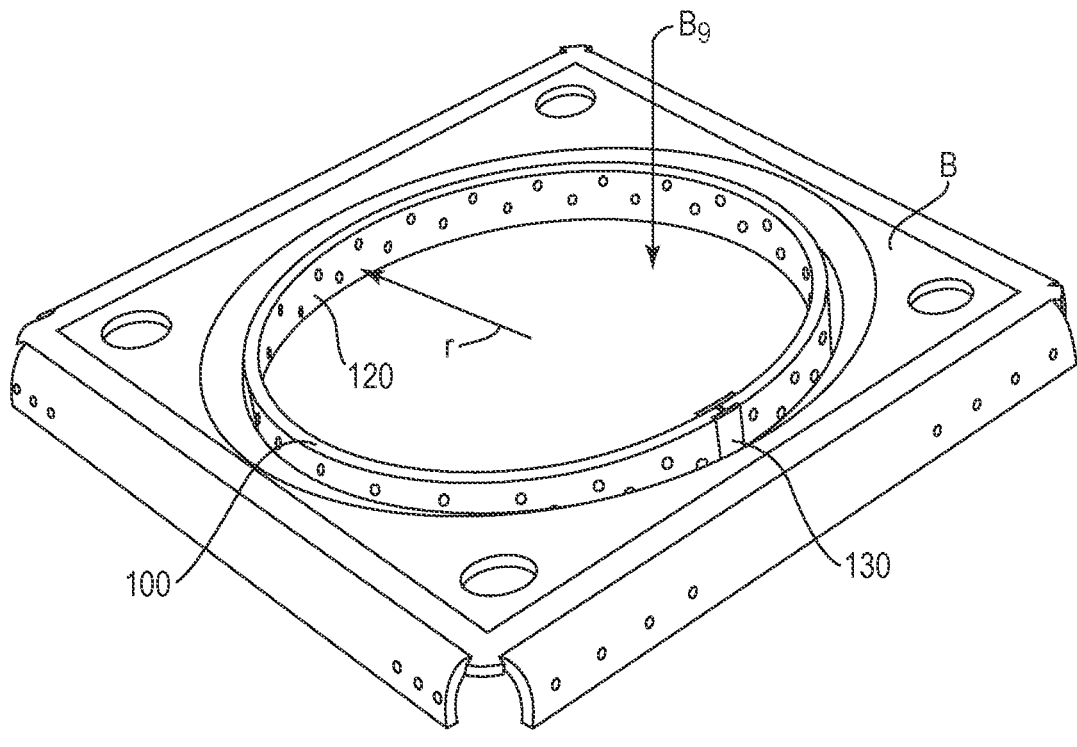
FIG. 9 is a perspective view of an assembled circular shaped rodent intrusion barrier as depicted in FIGS. 6 and 6A-F inserted within the bottom opening through the base plate of a foundation mounted electrical signaling and lighting pole fixture.

Referring to FIGS. 5, 6, 7 and 9, the band 120 is radially r perforated to allow passage of water and water vapor therethrough while preventing transit of rodents through the perforations 129. Generally, a plurality of perforations 129 with each perforation 129 less than about 1 $cm^2$ in area is suitable, with perforation 129 between about 0.2 $cm^2$ and 1 $cm^2$ preferred. Perforations 129 smaller than about 0.2 $cm^2$ tend to be readily plugged by air-borne dust and debris while perforations 129 greater than about 1 $cm^2$ do not dependably prevent transit by rodents.

Figures 6D, 6E, 6F:
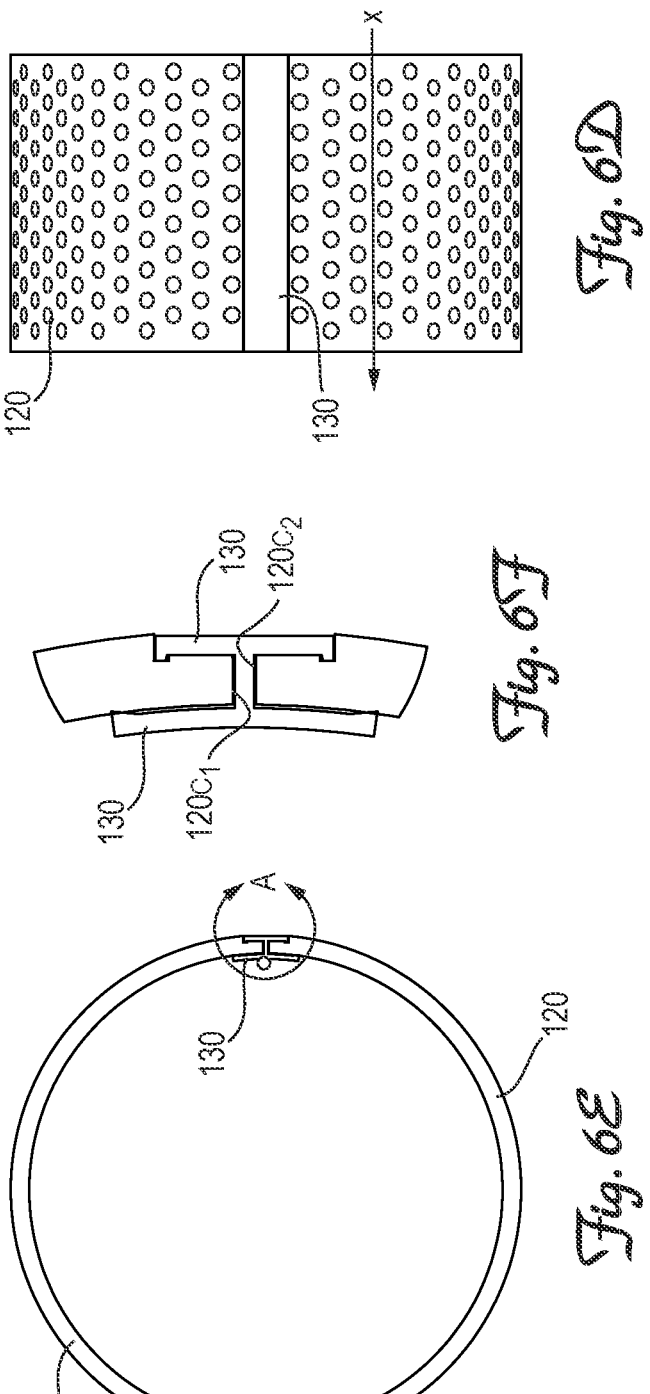
FIG. 6D is a side view of the assembled rodent intrusion barrier depicted in FIG. 6.
FIG. 6E is a top view of the assembled rodent intrusion barrier depicted in FIG. 6.
FIG. 6F is an enlarged top view of the assembled rodent intrusion barrier depicted in FIG. 6B, encircled by line A to facilitate viewing of the connected first and second peripherally adjacent ends of the band.
Figures 7D, 7E, 7F:
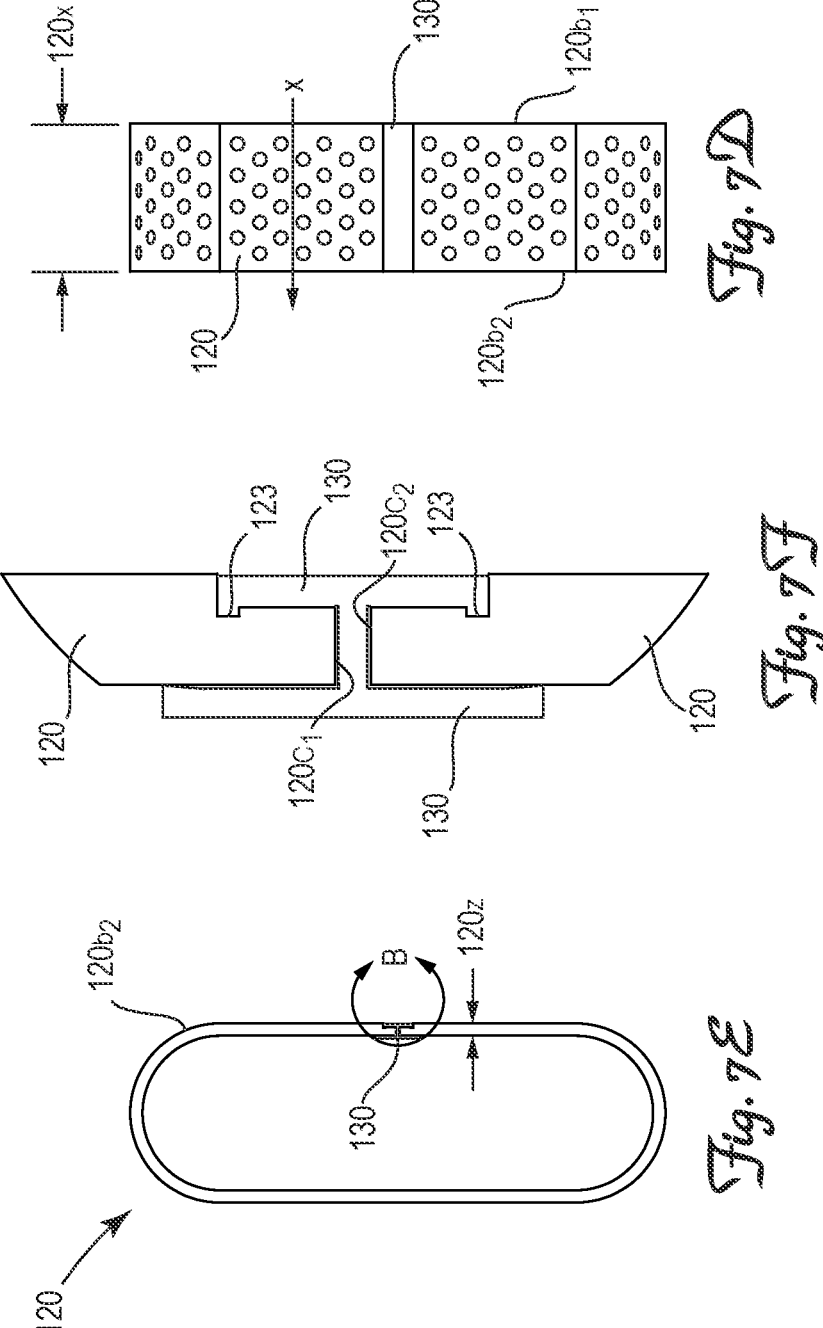
FIG. 7D is a side view of the assembled rodent intrusion barrier depicted in FIG. 7.
FIG. 7E is a top view of the assembled rodent intrusion barrier depicted in FIG. 7.
FIG. 7F is an enlarged top view of the assembled rodent intrusion barrier depicted in FIG. 7B, encircled by line A to facilitate viewing of the connected first and second peripherally adjacent ends of the band.
Figure 8:
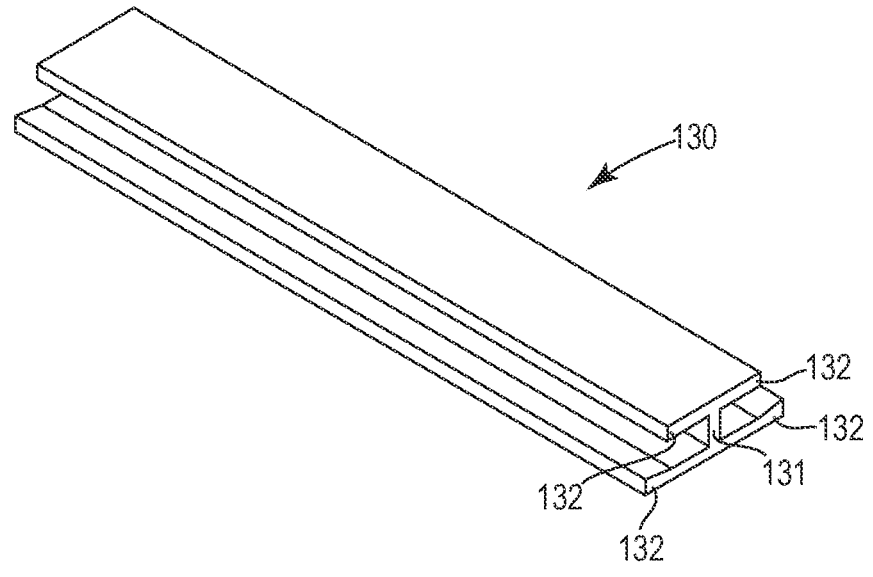
FIG. 8 is a perspective view of the slide-on H-shaped connector depicted in FIGS. 5, 5E, 5F, 6, 6E, 6F, and 7, 7E, 7F.
Figure 8A:
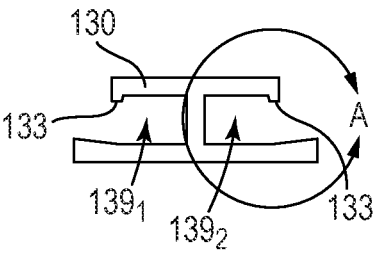
FIG. 8A is an end view of the slide-on H-shaped connector depicted in FIG. 8.
Figure 8B:
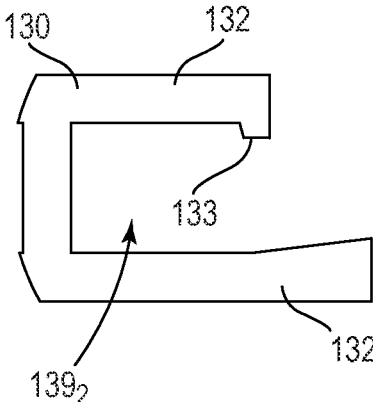
FIG. 8B is an enlarged end view of the slide-on H-shaped connector depicted in FIG. 8A encircled by line A to facilitate viewing of the interlocking tab on the connector.

Referring to FIGS. 5, 5D, 5E, 5F, 6, 6D, 6E, 6F, 7, 7D, 7E, 7F, 8, 8A and 8B, the connector 130 is configured and arranged to reliably connect the free ends $120c_1$ and $120c_2$ of the axially split band 120 after the band 120 has been installed around the wiring within the electrical wiring cavity $B_8$ of a foundation-mounted electrical signaling or lighting pole fixture A. The connector 130 is preferably of a type that can be quickly and easily fastened by hand without the need for any tools, and provides a reliable long-term connection. Suitable connectors 130 include specifically but not exclusively snap fit connectors, friction fit connectors, and slide on interlocking connectors.

The connector 130 can be provided as a separate component or formed on the ends $120c_1$ and $120c_2$ of the band 120.

The connector 130 should be constructed from an electrically insulating material such as plastic.

Referring to FIGS. 5C, 5F, 6C, 6F, 7C, 7F, 8, 8A and 8B, a particularly well-suited connector 130 is a slide-on H-shaped connector having legs 132 that define first and second receiving channels $139_1$ and $139_2$ on either side of a central crossbar 131, for receiving the first and second end margins $121c_1$ and $121c_2$ of the band 120. The slide-on H-shaped connector 130 provides the rodent intrusion barrier 100 with a modicum of tolerance in the overall circumference of the rodent intrusion barrier 100 as the end margins $121c_1$ and $121c_2$ of the band 120 need not be inserted to a precise depth within the receiving channels $139_1$ and $139_2$.

Optionally, at least one of the legs 132 defining each of the receiving channels $139_1$ and $139_2$ can have a protrusion 133 that extends towards and interlocks with a mated depression 123 in the band 120 for reliably holding the ends $120c_1$ and $120c_2$ of the band 120 together. The protrusion 133 advance securement of the end margins $121c_1$ and $121c_2$ of the band 120 within the receiving channels $139_1$ and $139_2$ of the slide-on H-shaped connector 130, but sacrifices any tolerance in the overall circumference of the rodent intrusion barrier 100.

Method of Making

The band 120 is well suited for manufacture via conventional extrusion techniques, with the cooled extruded band

120 perforated by standard mechanical drill or punch techniques. The perforated band 120 can then be heated to a softening point where the band 120 loses elasticity without slumping under its own weight, at which point it is reshaped by wrapping around a mandrel having the desired peripheral shape, and then cooled until the new shape is held and elasticity returns.

The connector 130, particularly an H-shaped connector, is also well suited for manufacture via conventional extrusion techniques.

Method of Installing

The rodent intrusion barrier 100 can be quickly and easily installed during original mounting of an electrical signaling or lighting pole fixture A onto a foundation F or retrofit onto a previously mounted electrical signaling or lighting pole fixture A without the need for a tool by (i) tangentially pulling the formed band 120 open and placing the band 120 around the wiring extending upward from the foundation F and through the bottom opening By in the base B mounted to the foundation F, (ii) manually securing the first and second peripherally adjacent ends 120$c_1$ and 120$c_2$ of the band 120 together by hand with a connector 130, and (iii) positioning the assembled rodent intrusion barrier 100 within the bottom opening By with the outer major surface 120$a_2$ of the band 120 facing the periphery of the bottom opening B$_9$ and one of the edges 120$b_1$ or 120$b_2$ engaging the top of the foundation F.

I claim:

1. A formed rodent intrusion barrier for foundation mounted electrical signaling and lighting pole fixtures having a bottom opening of defined peripheral shape into an electrical wiring cavity, comprising:

(a) a formed, radially thin, radially perforated, axially split, pliable, elastic, electrically insulating, encircling band having inner and outer radially spaced major surfaces, first and second axially spaced edges, and first and second peripherally adjacent ends, the band shaped to conform to the peripheral shape of the bottom opening and the perforations sized to allow passage of water and water vapor therethrough while preventing transit of rodents, and (b) a means for connecting the first and second ends of the formed band with the first and second ends facing one another to form a peripherally continuous non-overlapping barrier, the means for connecting selected from the group consisting of an electrically insulating push-on friction fit H-shaped connector, an electrically insulating push-on barbed friction fit H-shaped connector, and an electrically insulating slide-on H-shaped connector.

2. The formed rodent intrusion barrier of claim 1 wherein the band is formed as a circle.

3. The formed rodent intrusion barrier of claim 1 wherein the band is formed as an oval.

4. The formed rodent intrusion barrier of claim 1 herein the band is formed as a polygon.

5. The formed rodent intrusion barrier of claim 1 wherein the band is formed as a stadium.

6. The formed rodent intrusion barrier of claim 1 wherein the band is formed as a regular polygon.

7. The formed rodent intrusion barrier of claim 1 wherein the band is formed as a quadrilateral.

8. The formed rodent intrusion barrier of claim 1 wherein the band is formed as a rectangle.

9. The formed rodent intrusion barrier of claim 1 wherein the band is formed as a square.

10. The formed rodent intrusion barrier of claim 1 wherein the band is free-standing.

11. The formed rodent intrusion barrier of claim 1 wherein the band is extra thin.

12. The formed rodent intrusion barrier of claim 1 wherein the band is ultra thin.

13. The formed rodent intrusion barrier of claim 1 wherein the perforations are each less than about 1 cm$^2$ in area.

14. The formed rodent intrusion barrier of claim 1 wherein the perforations are each between 0.2 cm$^2$ and 1 cm$^2$ in area.

15. The formed rodent intrusion barrier of claim 1 wherein the means for connecting is an electrically insulating snap fit connector.

16. A method of protecting a foundation mounted electrical signaling and lighting pole fixture having a bottom opening of defined peripheral shape into an electrical wiring cavity against rodent intrusion, comprising the steps of:

(a) obtaining a formed rodent intrusion barrier of claim 1 having a form matching the peripheral shape of the bottom opening into the electrical wiring cavity, (b) installing the formed rodent intrusion barrier into the electrical wiring cavity with one of the axially spaced edges abutting the foundation, and (c) connecting the first and second ends of the formed band to form a peripherally continuous barrier.

\* \* \* \* \*